US006871972B2

(12) United States Patent
Ju

(10) Patent No.: US 6,871,972 B2
(45) Date of Patent: Mar. 29, 2005

(54) LIGHT MODULE FOR LCD PANEL

(75) Inventor: Chuang Meng Ju, Hsinchu (TW)

(73) Assignee: Toppoly Optoelectronics Corp. (TW)

( * ) Notice: Subject to any disclaimer, the term of this patent is extended or adjusted under 35 U.S.C. 154(b) by 0 days.

(21) Appl. No.: 10/302,829

(22) Filed: Nov. 25, 2002

(65) Prior Publication Data

US 2004/0100788 A1 May 27, 2004

(51) Int. Cl.[7] ............................................. G01D 11/28
(52) U.S. Cl. .............................. 362/26; 362/31; 362/84; 362/260; 362/551
(58) Field of Search ........................ 362/26, 31, 84, 362/260, 551, 555, 559, 561

(56) References Cited

U.S. PATENT DOCUMENTS

| | | | | |
|---|---|---|---|---|
| 6,466,135 B1 * | 10/2002 | Srivastava et al. | ....... | 340/815.4 |
| 6,608,329 B1 * | 8/2003 | Chen | ........................... | 257/79 |
| 6,637,905 B1 * | 10/2003 | Ng et al. | ...................... | 362/31 |
| 2003/0057829 A1 * | 3/2003 | Ellens et al. | ................ | 313/512 |
| 2003/0058634 A1 * | 3/2003 | Kunimochi et al. | .......... | 362/31 |

* cited by examiner

*Primary Examiner*—Sandra O'Shea
*Assistant Examiner*—Mark Tsidulko
(74) *Attorney, Agent, or Firm*—Lowe Hauptman Gilman & Berner, LLP

(57) ABSTRACT

A light module is disclosed with an LED light for a LCD panel. LGP or LGS have mixed with well-mixed fluorescent powders therein and the white light with triple wavelength is made by the light rays emitted from UV LED to excite the well-mixed fluorescent powders. The present invention reduces the production cost and increases the color performance of the LCD.

15 Claims, 6 Drawing Sheets

LIGHT MODULE FOR LCD PANEL

BACKGROUND OF THE INVENTION

1. Field of the Invention

The present invention generally relates to a light module with LED light source for LCD panel. More specifically, the present invention relates to a light module with LED light source for LCD panel wherein the LGP (light guide plate) or LGS (light guide stick) have mixed with well-mixed fluorescent powders therein and the white light with ripple wavelength is made by the light rays emitted from UV LED to excite the well-mixed fluorescent powders inside the LGP or LGS.

2. Description of the Prior Art

The visions of the liquid crystal display (LCD) are extremely excellent since the displayed figures or pictures are not offensive to the eyes of human being unlike light emitting diode (LED). But it is one of the drawbacks of LCD that an additional light module is needed in order to show figures or pictures on the screen under the dark circumstance because LCD does not have the character of light-emitting itself.

The light rays emitted from LED 102 in the front light module of the LCD panel 100 are guided into the surface of the LCD panel 108 through LGS 104 and LGP 106. FIG. 1A and FIG. 1B show the structure of conventional front light module and the passing paths of the light rays in this structure are illustrated as the arrows of the FIG. 1A and FIG. 1B, wherein the spectrum figure of the white light LED with the double wavelength protected by Nichia's patents is adopted as shown in FIG. 2.

FIG. 3 shows the rear light module 300 of the LCD panel, wherein the light rays emitted from LED 302 are guided into the surface of the LCD panel 308 through LGP 306, the reflector sheet 305, the diffuser sheets 307 and the prism sheets 309. The numbers of the diffuser sheets 307 and the prism sheets 309 depend on the design of the rear light module 300 of the LCD panel. The passing paths of the light rays in the conventional back light module are illustrated as the arrows of FIG. 3. The white light LED with the double wavelength protected by Nichia's patents is adopted as illustrated in FIG. 3.

It is well known that mixing many kinds of color lights can form a white light. For example, the white light with double wavelength seen by the eyes of human being is formed by mixing the blue and yellow lights and the white light with triple wavelength is formed by mixing the blue, green and red lights. Presently the marketed products of emitting the white light with double wavelength are made by the chip emitting a blue light to excite the YAG fluorescent powders. In the future the products of emitting the white light with triple wavelength by the chip emitting a ultraviolet ray to excite the RGB fluorescent powders are more popular because the advantages of the organic single-layer LED with triple wavelength white light are the lower cost and easier production.

It is the NICHIA's technogy that the InGaN chip 402 can emit blue lights with 460 nm wavelength is coated with the YAG fluorescent powders layer 404 as illustrated in the structure view of white light LED as FIG. 4, and the yellow lights with 555 nm wavelength are formed by the blue lights emitted from LED to excite the YAG fluorescent powders. Then mixing the blue and yellow lights can make the visible white light because the two color lights are complementary. Another technology of white light LED based on the ZnSe material is developed by Sumitomo Electric Industries. The white light LED can be used in the lighting of our ordinary life or the light source of the light module of LCD panel. The developed countries such European, America and Japan already spent lots of manpower and established the special institutions to promote the development of white light LED. Since the key technology and the patents of blue light are presently owned by few companies such as NICHIA, it is not easy for the Taiwan companies that are good at in the mass production and the cost reduction to produce the white light LED. Hence, the manufacturing cost can not be reduced due to the expensive price of white light LED for the manufacturers of LCD.

SUMMARY OF THE INVENTION

In light of the state of the art described above it is an object of the present invention to provide a light module with LED light source for LCD panel which is immune to the problems of the conventional light module with the white light LED for LCD panel described above and which can reduce the production cost of the LCD panel because the expensive white light LED protected Nichia's patents is replaced by the light rays emitted from the conventional UV LED as the light source to excite the fluorescent powders for forming the white lights.

In view of the above and other objects which will become apparent as the description proceeds, there is provided according to a general aspect of the present invention a front light module for LCD panel which includes a light source; a LGS mixed therein with mixed fluorescent powders for receiving the light rays emitted from the light source, such that a white light is formed when the light rays excite the mixed fluorescent powders; and a LGP for receiving the white light emitted from the LGS.

Based on the idea described above, wherein the light source is a LED.

Based on the aforementioned idea, wherein the LED is an UV LED and the mixed fluorescent powders include RGB fluorescent powders.

Based on the idea described above, wherein the LED is a violet light LED and the mixed fluorescent powders include RGB fluorescent powders.

Based on the aforementioned idea, wherein the LED is a blue light LED and the mixed fluorescent powders include RG fluorescent powders.

There is provided according to a general aspect of the present invention a front light module for LCD panel which includes a light source; a LGS for receiving the light rays emitted from the light source; and a LGP mixed therein with mixed fluorescent powders for receiving the light rays emitted from the LGS, such that a white light is formed when the light rays excite the mixed fluorescent powders.

There is provided according to a general aspect of the present invention a rear light module for LCD panel which includes a light source; and a LGP mixed therein with mixed fluorescent powders for receiving the light rays emitted from the light source, such that a white light is formed when the light rays excite the mixed fluorescent powders.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1A:
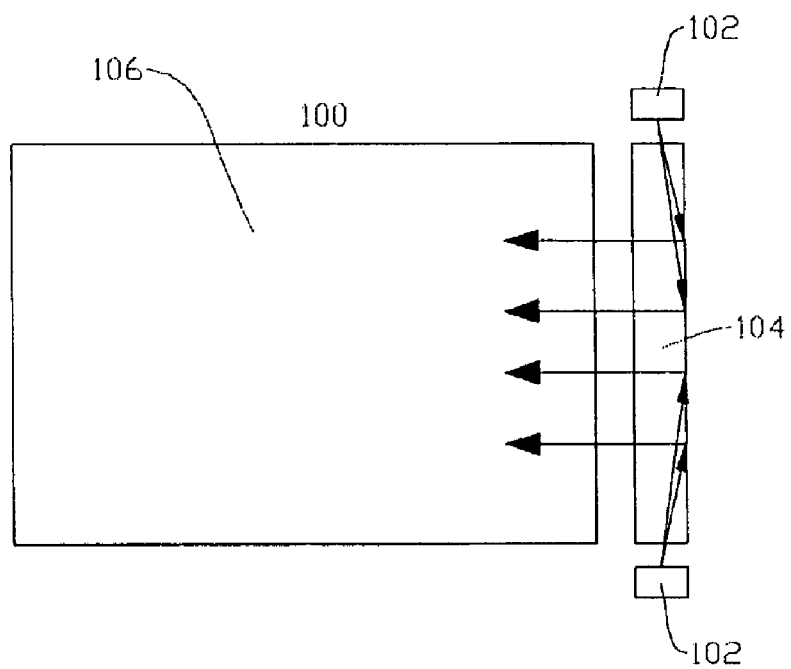
FIGS. 1A and 1B illustrate a conventional LCD panel with front light module.
Figure 1B:
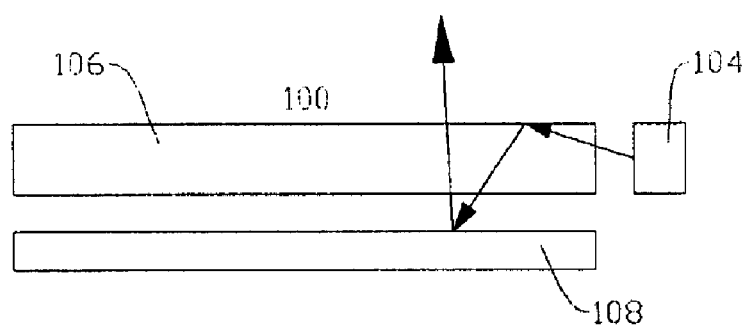
Figure 2:
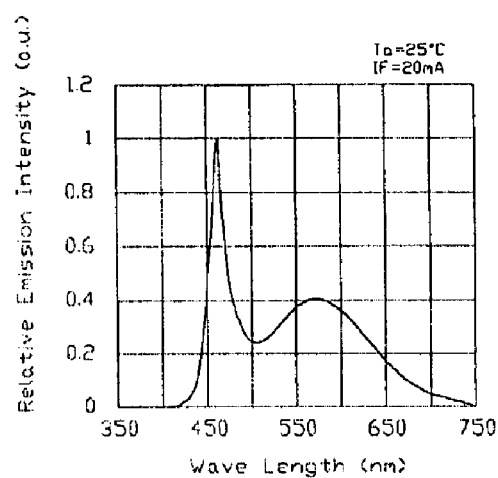
FIG. 2 illustrates a spectrum figure of the white light with double wavelength protected by Nichia's patents.
Figure 3:
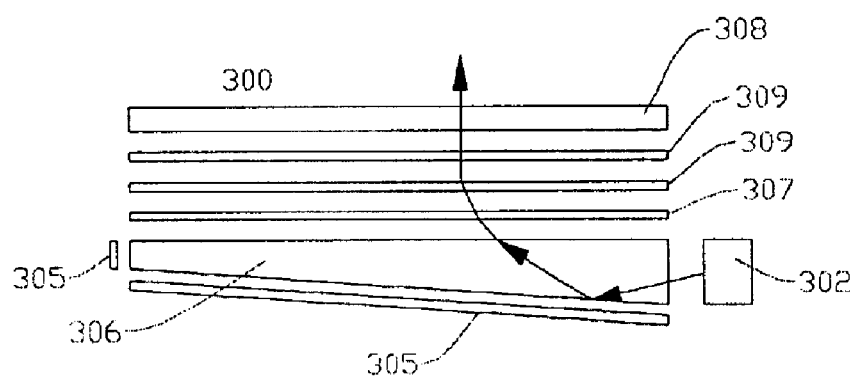
FIG. 3 illustrates a conventional LCD panel with rear light module.
Figure 4:
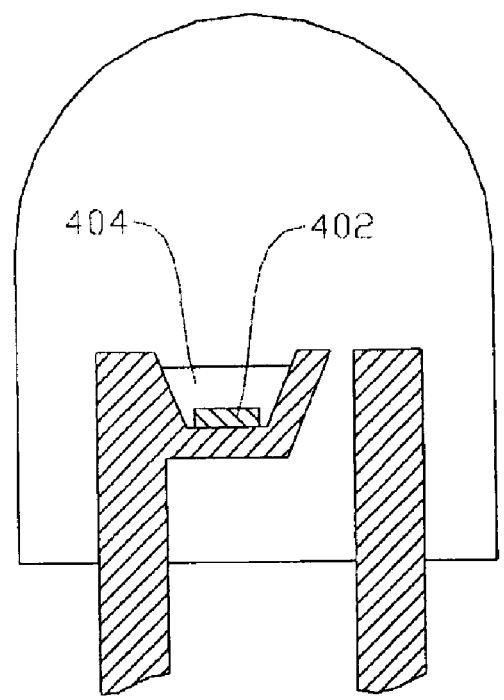
FIG. 4 illustrates the structure view of the white light LED.
Figure 5A:
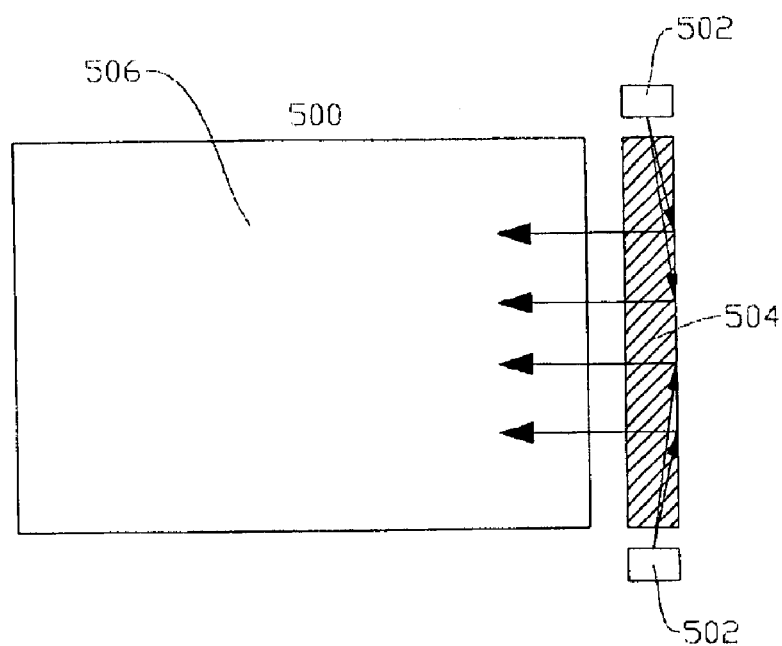
FIGS. 5A and 5B illustrate the first embodiment of the front light module for LCD panel according to the present invention, wherein LGS has mixed with the well-mixed fluorescent powders; therein.
Figure 5B:
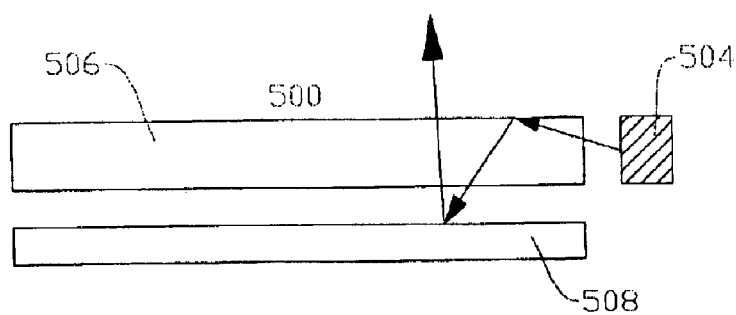

Regarding the preferred embodiment of the present invention, please refer to the structure of the front light module of LCD panel 500 as illustrated in FIG. 5A and FIG. 5B. It includes the UV (ultraviolet) LED 502 is used as the light source, the LGS 504 having mixed with the well-mixed fluorescent powders therein, the LGP 506, and the LCD panel 508. The arrows in the figures show the passing paths of the light rays in the front light module. The light rays emitted from the UV LED 502, a point light source, will enter into the LGS 504. By the guiding effect of the cuts on the LGS 504 (not shown in these figures), the light rays emitted from the LGS 504 as a line light source will enter into the LGP 506 by the refraction and reflection effects. Similarly, the light rays emitted from the LGP 506 as a plane light source by the guiding effect of the cuts on the LGP 506 (not shown in these figures) will enter into the panel 508 by the refraction and reflection effects. Finally, the visible white light at the LCD panel will be seen after the reflection. By the light rays emitted from the conventional UV LED 502 as the light source will excite the RGB fluorescent powders to form the white lights when the UV rays enter into the LGS 504 having mixed with the well-mixed fluorescent powders therein as clearly shown in the FIG. 5A and FIG. 5B.

Figure 6A:
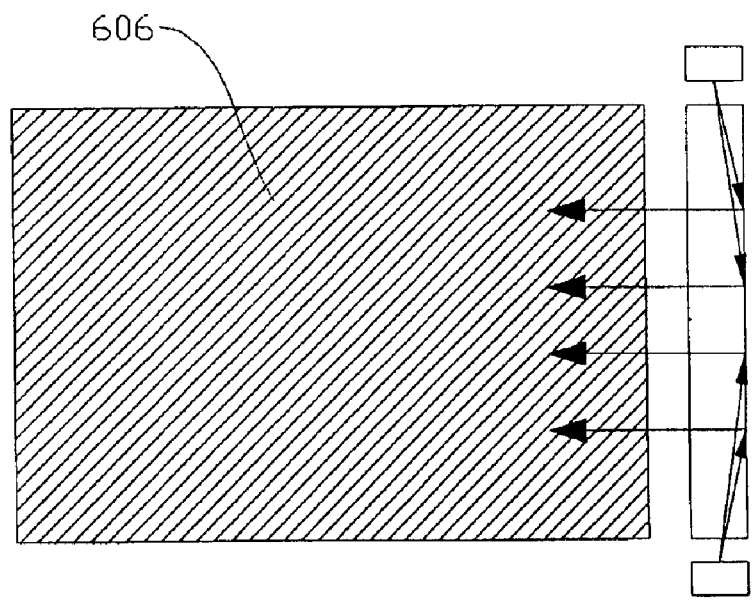
FIGS. 6A and 6B illustrate the second preferred embodiment of the front light module for LCD panel according to the present invention, wherein LGP has the well-mixed fluorescent powders therein.
Figure 6B:
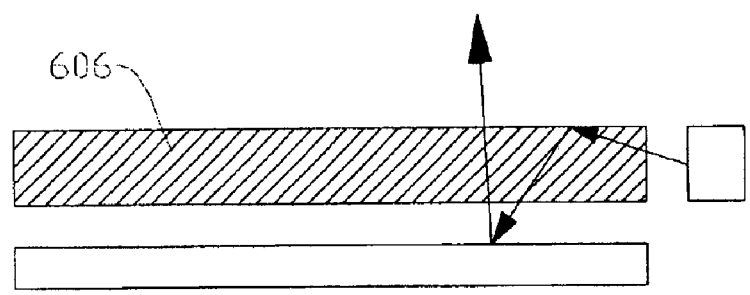

Another preferred embodiment of the present invention is shown in FIG. 6A and FIG. 6B, wherein LGP 606 has mixed with the well-mixed RGB fluorescent powders therein that can be excited into the white lights by the light rays emitted from the conventional UV LED 602.

Figure 7:
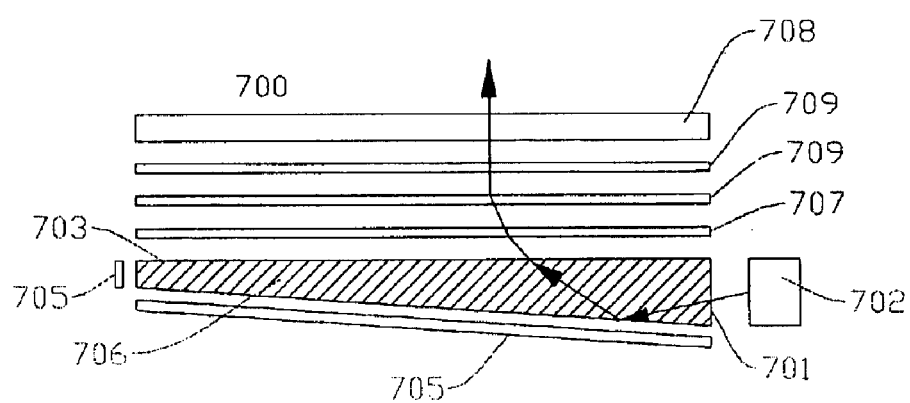
FIG. 7 illustrates the third preferred embodiment of the rear light module for LCD panel according to the present invention, wherein LGP has mixed with the well-mixed fluorescent powders therein.

The present invention can be applied to the back light module of LCD panel. FIG. 7 shows the structure of the back light module of LCD panel 700 under the present invention, wherein LGP 706, which has the surfaces 701, 703, mixed with the well-mixed RGB fluorescent powders therein that can be excited into the white lights by the light rays emitted from the conventional UV LED 702. The light rays emitted from UV LED 702 are guided into the surface of the LCD panel 708 through LGP 706, two reflector sheets 705, the diffuser sheets 707 and the prism sheets 709. The numbers of the diffuser sheets 707 and the prism sheets 709 depend on the design of the rear light module 700 of the LCD panel. The passing paths of the Besides, the above embodiments only show LGS or LGP have mixed with well-mixed RGB fluorescent powders therein that can be excited into the white lights with triple wavelength by the light rays emitted from the UV LED as the light source, but it shall not be limited to such embodiments. For example, the white lights with triple wavelength can make by the light rays emitted from the violet light LED to excite the RGB fluorescent powders or the light rays emitted from the blue light LED to excite the RG fluorescent powders. It has still the better color performance than the conventional white light with double wavelength of Nichia.

Although specific embodiments have been illustrated and described, it will be obvious to those skilled in the art that various modifications may be made without departing from what is intended to be limited solely by the appended claims.

What is claimed is:

1. A front light module for LCD panel, comprising:
    a light source;
    a light guide stick (LGS) mixed therein with mixed fluorescent powders for receiving the light rays emitted from said light source, such that a white light is formed when said light rays excite said mixed fluorescent powders; and
    a light guide plate (LGP) for receiving said white light emitted from said light guide stick.

2. The front light module for LCD panel according to claim 1, wherein said light source is a LED.

3. The front light module for LCD panel according to claim 2, wherein said LED is an UV LED and said mixed fluorescent powders include RGB fluorescent powders.

4. The front light module for LCD panel according to claim 2, wherein said LED is a violet light LED and said mixed fluorescent powders include RGB fluorescent powders.

5. The front light module for LCD panel according to claim 2, wherein said LED is a blue light LED and said mixed fluorescent powders include RG fluorescent powders.

6. A front light module for LCD panel, comprising:
    a light source;
    a light guide stick (LGS) for receiving the light rays emitted from said light source; and
    a light guide plate (LGP) mixed therein with mixed fluorescent powders for receiving the light rays emitted from said light guide stick, such that a white light is formed when said light rays excite said mixed fluorescent powders.

7. The front light module for LCD panel according to claim 6, wherein said light source is a LED.

8. The front light module for LCD panel according to claim 7, wherein said LED is an UV LED and said mixed fluorescent powders include RGB fluorescent powders.

9. The front light module for LCD panel according to claim 7, wherein said LED is a violet light LED and said mixed fluorescent powders include RGB fluorescent powders.

10. The front light module for LCD panel according to claim 7, wherein said LED is a blue light LED and said mixed fluorescent powders include RG fluorescent powders.

11. A rear light module for LCD panel, comprising:
    a light source; and
    a light guide plate (LGP) mixed therein with mixed fluorescent powders for receiving the light rays emitted from said light source, such that a white light is formed when said light rays excite said mixed fluorescent powders.

12. The rear light module for LCD panel according to claim 11, wherein said light source is a LED.

13. The rear light module for LCD panel according to claim 12, wherein said LED is an UV LED and said mixed fluorescent powders include RGB fluorescent powders.

14. The rear light module for LCD panel according to claim 12, wherein said LED is a violet light LED and said mixed fluorescent powders include RGB fluorescent powders.

15. The rear light module for LCD panel according to claim 12, wherein said LED is a blue light LED and said mixed fluorescent powders include RG fluorescent powders.

* * * * *